(12) United States Patent
Kreski

(10) Patent No.: US 9,302,938 B2
(45) Date of Patent: Apr. 5, 2016

(54) STRENGTHENED GLASS AND METHODS FOR MAKING USING DIFFERENTIAL DENSITY

(71) Applicant: ASAHI GLASS COMPANY, LIMITED, Tokyo (JP)

(72) Inventor: Patrick K. Kreski, Alfred Station, NY (US)

(73) Assignee: ASAHI GLASS COMPANY, LIMITED, Tokyo (JP)

(*) Notice: Subject to any disclaimer, the term of this patent is extended or adjusted under 35 U.S.C. 154(b) by 53 days.

(21) Appl. No.: 14/046,935

(22) Filed: Oct. 5, 2013

(65) Prior Publication Data

US 2014/0178690 A1  Jun. 26, 2014

Related U.S. Application Data

(60) Provisional application No. 61/710,139, filed on Oct. 5, 2012.

(51) Int. Cl.
*C03C 21/00* (2006.01)

(52) U.S. Cl.
CPC ............ *C03C 21/002* (2013.01); *Y10T 428/315* (2015.01)

(58) Field of Classification Search
None
See application file for complete search history.

(56) References Cited

U.S. PATENT DOCUMENTS

| | | | |
|---|---|---|---|
| 3,433,611 A | 3/1969 | Saunders et al. | |
| 3,453,095 A | 7/1969 | Loukes et al. | |
| 4,671,814 A | 6/1987 | Aratani et al. | |
| 4,859,636 A | 8/1989 | Aratani et al. | |
| 5,654,057 A | 8/1997 | Kitayama et al. | |
| 5,733,622 A | 3/1998 | Starcke et al. | |
| 6,748,765 B2 | 6/2004 | Pitbladdo | |

(Continued)

FOREIGN PATENT DOCUMENTS

| | | |
|---|---|---|
| JP | S61205640 A | 9/1986 |
| JP | H0927150 A | 1/1997 |

(Continued)

OTHER PUBLICATIONS

International Search Report for International Application No. PCT/JP2014/060353, mailed May 13, 2014, 2 pages.

(Continued)

*Primary Examiner* — Lisa Herring
(74) *Attorney, Agent, or Firm* — Oblon, McClelland, Maier & Neustadt, L.L.P.

(57) ABSTRACT

Chemically strengthened glass and a method for making utilizing differential areal density are provided. The method includes providing a substrate having a glass chemical structure. Host alkali ions are situated in the chemical structure. The substrate has a treatment-rich volume and a treatment-poor volume located as opposed to each other in the substrate. The method also includes providing an exchange medium characterized by having an areal density, associated with an ion exchange rate, of invading alkali ions having an average ionic radius that is larger than an average ionic radius of the host alkali ions. The method also includes providing a modified exchange medium characterized by having a modified areal density, associated with a modified ion exchange rate, of the invading alkali ions. The method also includes applying the exchange mediums and conducting ion exchange to produce the strengthened substrate.

16 Claims, 4 Drawing Sheets

(56) References Cited

U.S. PATENT DOCUMENTS

| | | |
|---|---|---|
| 6,810,688 B1 | 11/2004 | Duisit et al. |
| 7,059,154 B1 | 6/2006 | Quentin et al. |
| 7,743,630 B2 | 6/2010 | Krasnov et al. |
| 8,304,078 B2 | 11/2012 | Varshneya |
| 8,507,392 B2 | 8/2013 | Yamauchi et al. |
| 2005/0090377 A1 | 4/2005 | Shelestak et al. |
| 2006/0075783 A1 | 4/2006 | Kim et al. |
| 2009/0226671 A1 | 9/2009 | Yanase et al. |
| 2011/0293928 A1 | 12/2011 | Chu et al. |
| 2012/0085130 A1 | 4/2012 | Hill et al. |
| 2012/0094084 A1 | 4/2012 | Fisher et al. |
| 2012/0207980 A1 | 8/2012 | Yui et al. |
| 2012/0295072 A1 | 11/2012 | Kato et al. |
| 2012/0321898 A1 * | 12/2012 | Meinhardt et al. ............ 428/410 |
| 2012/0329525 A1 * | 12/2012 | Hashimoto et al. ........... 455/566 |

FOREIGN PATENT DOCUMENTS

| | | |
|---|---|---|
| WO | WO 2011104035 A2 * | 9/2011 |
| WO | 2012048293 A2 | 4/2012 |

OTHER PUBLICATIONS

U.S. Appl. No. 14/808,970, filed Jul. 24, 2015, Kreski.

\* cited by examiner

STRENGTHENED GLASS AND METHODS FOR MAKING USING DIFFERENTIAL DENSITY

PRIORITY

This application claims priority to U.S. Provisional Application No. 61/710,139, entitled "Strengthened Glass and Curvature Control" by Patrick K. Kreski filed on Oct. 5, 2012, which is incorporated herein by reference in its entirety.

BACKGROUND

Chemical strengthening of glass, also called ion-exchange strengthening or chemical tempering, is a technique to strengthen a prepared glass article by increasing compression within the glass itself. It generally involves introducing larger alkali ions into the glass chemical structure, to replace smaller alkali ions present in the structure. A common implementation of chemical strengthening in glass occurs through the exchange of sodium ions, having a relatively smaller ionic radius, with potassium ions, having a relatively larger ionic radius by submerging a glass substrate containing sodium ions in a bath containing molten potassium salts.

Chemical strengthening is often utilized to increase compression in order to increase strength, abrasion resistance, and/or thermal shock resistance into a glass article. The increased compression can be introduced to various depths in the glass and is often implemented within a surface layer. Chemical strengthening is commonly utilized for treating flat glass. But it may also be used for treating non-flat glass articles, such as cylinders and other shapes of greater geometric complexity.

Flat glass is commonly manufactured by a number of known techniques. These include the float glass method and drawing methods, such as the fusion down-draw method and the slot draw method. However, a prepared flat glass article may have variations in its chemical composition and/or structure at different locations in the glass. For example, flat glass that is manufactured by the float glass technique is often prepared by spreading softened glass material on a molten metal surface such as tin. The glass is then cooled to form a solid, flat glass. As a result, the prepared flat glass often contains a greater amount of tin on the side that was nearer the molten tin and the concentration of tin is commonly greater near the surface of that side.

Chemical strengthening is often used to treat glass having variations in chemical composition and/or structure at different locations in the glass. The variations produce locations that are treatment-rich or treatment-poor relative to each other for ion exchange and/or compression development in chemical strengthening. When chemical strengthening is used to treat such glass, the introduced compressive stress is often not uniformly distributed. This may introduce a bending moment and subsequent induced curvature in a glass article treated by chemical strengthening, particularly for glass articles having a width of less than 3 mm. The induced curvature is often undesirable. Induced curvature is especially problematic in manufacturing thin flat glass articles according to manufacturing specifications that include the enhanced physical properties associated with chemical strengthening, but without induced curvature. For example, glass used in manufactured electronic articles, such as displays for "smart" phones, often requires glass that is uniformly flat and high in strength and in abrasion resistance.

For a thin, flat glass article, such as an article having two major surfaces, the non-equivalence of interdiffusion of invading alkali ions and/or compression generation properties between the major surfaces of the flat glass substrate after chemical strengthening commonly often has an effect, such that a local force times the distance from the mid-plane of a glass article is not equivalent when summed from the treatment-poor surface to the mid-plane and from the rich surface to the mid-plane. Thus the net bending moment about the mid-plane is non-zero (i.e., there is a non-zero net bending moment of the stress about the mid-plane). As a result, bending stresses are generated. For glass articles of thin cross-section, these bending stresses generate deflection of the glass article from flat. That is, thin, chemically strengthened glasses manufactured by the float process often exhibit measurable curvature after chemical strengthening. The direction of curvature is often concave on the poor surface and convex on the rich surface.

In recent years, various types of efforts have attempted to overcome the problem of induced curvature that is associated with the chemical strengthening of glass. One approach involves grinding and polishing a prepared glass prior to chemical strengthening. The grinding and polishing is performed to remove those parts of a glass having a different chemical composition and/or structure. An example of this approach is grinding and polishing a flat glass made by the float method to remove the surface layer(s) containing a significant amount of tin. However, grinding and polishing the float glass introduces abrasions and may introduce other physical defects, in addition to the added time and expense associated with performing the grinding and polishing. Other approaches have involved secondary chemical treatments of prepared glass done prior to chemical strengthening. The secondary chemical treatments are utilized in an attempt to address differences chemical composition and/or structure at different locations in the glass. However secondary chemical treatments can alter the physical properties of the glass and otherwise degrade a glass produced through subsequent chemical strengthening. Also, like grinding and polishing, secondary chemical treatments involve the time and expense of an extra processing step that is done prior to chemical strengthening.

Given the foregoing, chemically strengthened glass and methods for making chemically strengthened glass are desired in which the strengthened glass has reduced induced curvature. It is also desired that the strengthened glass not have the drawbacks associated with grinding and polishing or secondary chemical treatment(s) applied in prior methods associated with the chemical strengthening of the glass. It is also desired that the strengthened glass have the improved physical properties of chemically strengthened glass, such as higher strength, higher abrasion resistance, and/or higher thermal shock resistance.

SUMMARY

This summary is provided to introduce a selection of concepts. These concepts are further described below in the detailed description in conjunction with the accompanying drawings. This summary is not intended to identify key features or essential features of the claimed subject matter, nor is this summary intended as an aid in determining the scope of the claimed subject matter.

According to an implementation, there is a method for making a strengthened substrate. The method may include providing a substrate. The substrate may be characterized by having a glass chemical structure. The glass chemical structure may include host alkali ions having an average ionic radius situated in the glass chemical structure. The substrate may have dimensional volumes including a treatment-rich volume and a treatment-poor volume. The volumes may be located as opposed to each other in the substrate. The method may also include providing an exchange medium. The exchange medium may be characterized by having an areal density of invading alkali ions having an average ionic radius that is larger than the average ionic radius of the host alkali ions. The areal density may be associated with an ion exchange rate of the invading alkali ions. The method may also include providing a modified exchange medium characterized by having a modified areal density of the invading alkali ions. The modified areal density may be associated with a modified ion exchange rate that is slower than the ion exchange rate. The method may include applying the modified exchange medium to a surface of the treatment-rich volume. The method may also include applying the exchange medium to a surface of the treatment-poor volume. The method may also include conducting ion exchange while applying one or more of the exchange medium and the modified exchange medium to produce the strengthened substrate.

According to another implementation, there is an article of manufacture. The article may include a chemically strengthened substrate characterized by having a glass chemical structure including alkali ions situated in the glass chemical structure. The substrate may have dimensional volumes including a treatment-rich volume including a rich surface of the substrate. The volumes may also include a treatment-poor volume including a poor surface of the substrate and characterized by having a variation from the treatment-rich volume in at least one of a chemical composition and a chemical structure. The volumes may also include a bulk volume, within the substrate, that may be adjacent at least one of the treatment-rich volume and the treatment-poor volume. A concentration of metal may be in at least one of the treatment-poor volume and the treatment-rich volume. The concentration of metal may be ≥ about 0.4 mole % higher than a concentration of the metal in the bulk volume. A concentration of the metal may be higher in the treatment-poor volume than a concentration of the metal in the treatment-rich volume. A concentration of alkali ions may be in a diffusion depth of one or more of the treatment-rich volume and the treatment-poor volume. The concentration of alkali ions may be ≤ about 0.5 mole % higher than a concentration of the alkali ions in the bulk volume.

According to another implementation, there is an article of manufacture. The article may include a chemically strengthened substrate. The chemically strengthened substrate may be made by a process including providing a substrate. The substrate may be characterized by having a glass chemical structure comprising host alkali ions having an average ionic radius situated in the glass chemical structure. The substrate may have dimensional volumes including a treatment-rich volume and a treatment-poor volume. The volumes may be located as opposed to each other in the substrate. The process may also include providing an exchange medium. The exchange medium may be characterized by having an areal density of invading alkali ions having an average ionic radius that is larger than the average ionic radius of the host alkali ions. The areal density may be associated with an ion exchange rate of the invading alkali ions. The process may also include providing a modified exchange medium. The modified exchange medium may be characterized by having a modified areal density of the invading alkali ions. The modified areal density may be associated with a modified ion exchange rate that is slower than the ion exchange rate. The process may also include applying the modified exchange medium to a surface of the treatment-rich volume. The process may also include applying the exchange medium to a surface of the treatment-poor volume. The process may also include conducting ion exchange while applying one or more of the exchange medium and the modified exchange medium to produce the strengthened substrate.

The above summary is not intended to describe each embodiment or every implementation. Further features, their nature and various advantages are described in the accompanying drawings and the following detailed description of the examples and embodiments.

BRIEF DESCRIPTION OF THE DRAWINGS

The accompanying drawings, which are incorporated in and constitute a part of this specification, illustrate one or more embodiments described herein and, together with the description, explain these embodiments. In addition, it should be understood that the drawings are presented for example purposes only. In the drawings.

DETAILED DESCRIPTION

The following detailed description refers to the accompanying drawings. The same reference numbers in different drawings may identify the same or similar elements.

Overview

The present invention is useful for making chemically strengthened glass, and has been found to be particularly advantageous for making chemically strengthened glass having reduced induced curvature. A chemically strengthened glass, according to the principles of the invention, does not have the drawbacks associated with grinding and polishing or secondary chemical treatment(s) when done prior to chemical strengthening. While the present invention is not necessarily limited to such applications, various aspects of the invention are appreciated through a discussion of various examples using this context.

Figure 1:
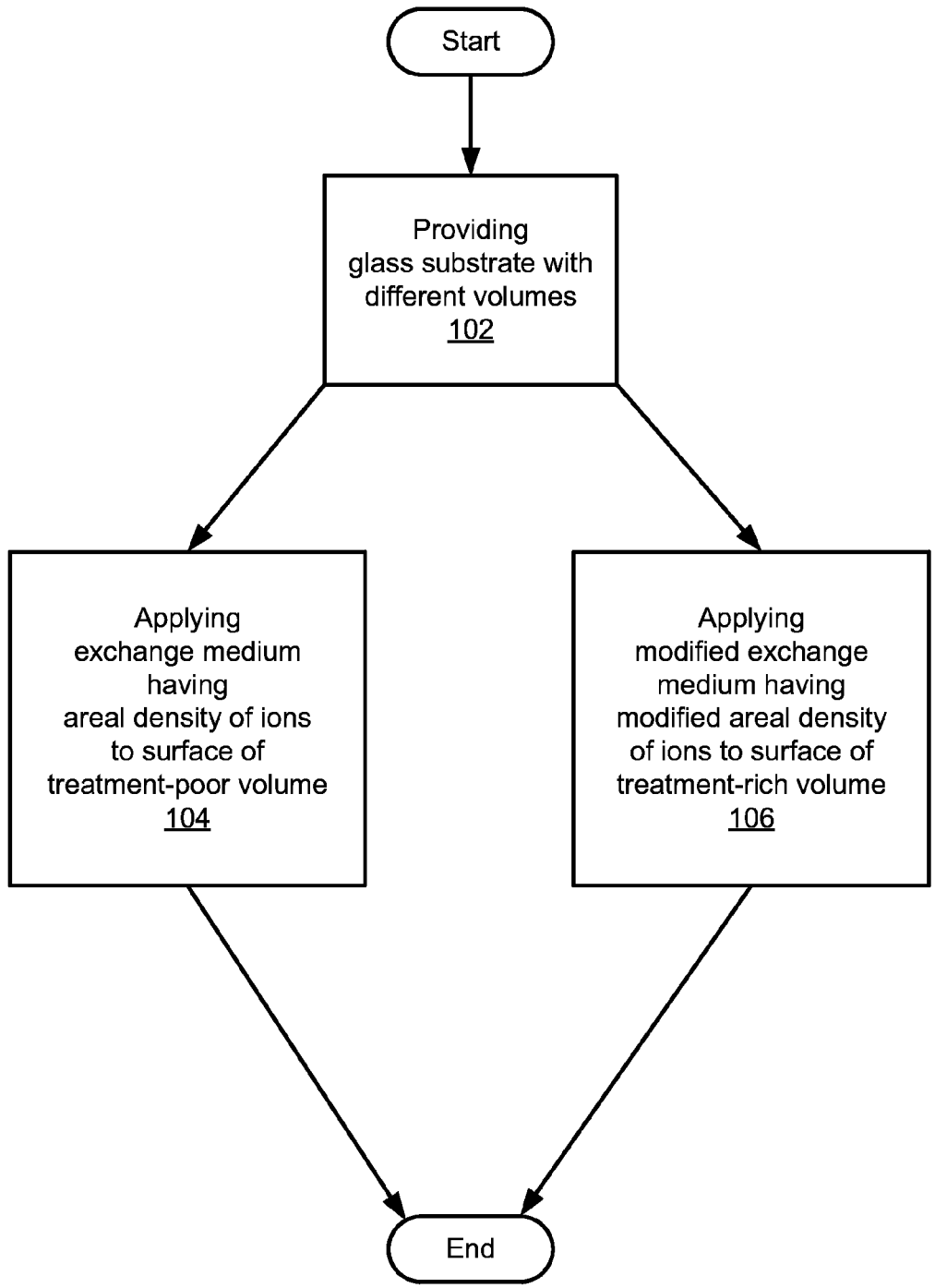
FIG. 1 is a flowchart illustrating an exemplary overview of an implementation described herein.

FIG. 1 is flowchart illustrating an exemplary overview of an implementation described herein. Assume that a glass substrate has variations in its chemical composition and/or chemical structure at different locations or "volumes" in the glass. One type of variation has a chemical composition and/or chemical structure that is more readily treated by chemical strengthening and is a "treatment-rich" volume. Another type of variation has a chemical composition and/or chemical structure that is less readily treated by chemical strengthening and is a "treatment-poor" volume. The term "treatment-rich volume" refers to a volume of a glass substrate which exhibits faster alkali ion interdiffusion and/or greater compression development during chemical strengthening relative to a "treatment-poor volume" under equivalent chemical strengthening conditions applied to the glass substrate. A volume may occur at a surface of a substrate, or in a space or layer beneath the surface. A treatment-rich volume or treatment-poor volume may be a surface layer of a glass substrate in which the diffusion of invading alkali ions extends to a given "diffusion depth" from the surface, also called a penetration depth or a diffusion layer. In chemical strengthening, a portion of the diffusion depth is in compressive stress, called case depth. Case depth is the width of the diffusion layer that is in compressive stress in a specimen.

Different exchange mediums may be utilized in performing the chemical strengthening of the treatment-rich volume and the treatment-poor volume. Assume also that the different exchange mediums may be distinguished by having different areal densities of invading alkali ions within the different exchange mediums. "Areal density", also known as area density or surface density is a measure of mass or moles per unit of area. An "areal density of invading alkali ions" of an exchange medium is a measure of the moles of invading alkali ions per measure of surface area on a substrate to which the exchange medium is applied, such as a surface of a treatment-rich volume or treatment-poor volume at a surface of a glass substrate.

As shown in FIG. 1, at step 102, a glass substrate is provided with different volumes, a treatment-rich volume and a treatment-poor volume. At step 104, an exchange medium, having an areal density of invading alkali ions, is applied to a surface of a treatment-poor volume. At step 106, a modified exchange medium having a modified areal density, one that is modified to be a lesser areal density of invading alkali ions than the exchange medium applied in step 104, is applied to a surface of a treatment-rich volume in the glass substrate. An areal density of invading alkali ions in an exchange medium may be modified by changing at least one of (1) the volume of the exchange medium applied to the separate surfaces or (2) the concentration of invading alkali ions in the exchange mediums applied to the separate surfaces of the substrate.

While the exchange mediums are applied, chemical strengthening proceeds to produce a strengthened substrate in which the induced curvature has been reduced or nullified through the application of the different exchange mediums to the different volumes. Without wishing to be bound by any particular theory, it appears that the lower areal density of invading alkali ions applied to the treatment-rich volume offsets the difference in ion-exchangeability between the treatment-rich and treatment-poor volumes, thus reducing or nullifying induced curvature that may otherwise result from chemical strengthening of the glass substrate.

For simplicity and illustrative purposes, the present invention is described by referring mainly to embodiments, principles and examples thereof. In the following description, numerous specific details are set forth in order to provide a thorough understanding of the examples. It is readily apparent however, that the embodiments may be practiced without limitation to these specific details. In other instances, some embodiments have not been described in detail so as not to unnecessarily obscure the description. Furthermore, different embodiments are described below. The embodiments may be used or performed together in different combinations.

The operation and effects of certain embodiments can be more fully appreciated from the examples, as described below. The embodiments on which these examples are based are representative only. The selection of these embodiments to illustrate the principles of the invention does not indicate that materials, components, reactants, conditions, techniques, configurations and designs, etc. which are not described in the examples are not suitable for use, or that subject matter not described in the examples is excluded from the scope of the appended claims or their equivalents. The significance of the examples may be better understood by comparing the results obtained therefrom with potential results which may be obtained from tests or trials that may be, or may have been, designed to serve as controlled experiments and to provide a basis for comparison.

As used herein, the terms "based on", "comprises", "comprising", "includes", "including", "has", "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present). Also, use of the "a" or "an" is employed to describe elements and components. This is done merely for convenience and to give a general sense of the description. This description should be read to include one or at least one and the singular also includes the plural unless it is obvious that it is meant otherwise.

The meaning of abbreviations and certain terms used herein is as follows: "mm" means millimeter(s), "µm" means micrometer(s) or micron(s), "g" means gram(s), "mg" means milligram(s), "µg" means microgram(s), "L" means liter(s), "mL" means milliliter(s), "cc" means cubic centimeter(s), "cc/g" means cubic centimeters per gram, "mol" means mole(s), "mmol" means millimole(s), "wt %" means percent by weight and "mol %" means percent by mole.

Exemplary Substrate Glasses

As used herein a "glass substrate" may comprise any kind of ion-exchangeable glass. Examples of such glass include soda-lime silicate glass, alkali aluminosilicate glass or alkali aluminoborosilicate glass, though other glass compositions are contemplated including glasses where glass forming components are free of silica, such as boron oxide (borate), phosphorous oxide (phosphate), aluminum oxide (aluminate), etc. As used herein, "ion exchangeable" means that a glass substrate is capable of exchanging alkali ion located in the glass structure of the substrate (i.e., "host alkali ions"), such as at or near the surface of the substrate, with larger alkali ions (i.e., "invading alkali ions") from an exchange medium that may be a liquid, solid or gas. An "ion exchange rate" refers to an amount of invading ions entering a substrate over a period of time. A glass may have chemical composition and/or chemical structure variations at different locations or "volumes" in the glass. An example of chemical composition variation is an excess of metal, such as metal ions or other forms of metal and may include a metal species, such as tin or lead. An example is metal that remains in a flat glass made by a float glass method, such as tin. An example of chemical structure variation is the presence of an element in the glass in which the element may have different valences throughout different volumes, such as tin present in $Sn^{2+}$ and $Sn^{4+}$ valences in the different volumes. In this example, the different forms of tin form different chemical structures in the different volumes.

Exemplary embodiments of substrate glasses include silicate glasses, such as soda-lime silicate glass or sodium aluminosilicate glass that includes alumina, at least one alkali metal and, in some embodiments, greater than 50 mol % $SiO_2$, in other embodiments at least 58 mol % $SiO_2$, and in still other embodiments at least 60 mol % $SiO_2$.

Exemplary Strengthened Glasses

Exemplary embodiments of chemically strengthened glasses include soda-lime silicate glass and sodium aluminosilicate glass which are strengthened, such as, in potassium nitrate salt baths. Chemical strengthening may be performed at various temperatures, such as at temperatures above about 400° C., preferably about 430° C., and with ion exchange durations of about 1-24 hours. The zone of compressive stress occurs, for example, within a diffusion depth of about 5, 10, 20, 30, 40, 50, 60, 70, 80, 90, 100 or 125 to about 150 µm of a surface of a substrate glass. According to an exemplary embodiment, compressive stress in a strengthened glass is greatest at a surface (i.e., a "surface compression") of the glass and the level of compressive stress follows a gradient extending downward from the surface through a case depth in the strengthened glass. In exemplary embodiments, the amount of surface compression may be up to about 800 MPa or higher in strengthened soda-lime silicate glass and up to about 1200 MPa or higher in aluminosilicate glass. In some exemplary embodiments, surface compression is about 200-650 MPa in strengthened soda-lime silicate glass and about 300-850 MPa in aluminosilicate glass. In other exemplary embodiments, surface compression is about 400-600 MPa in strengthened soda-lime silicate glass and about 600-800 MPa in aluminosilicate glass.

In some exemplary embodiments, a strengthened silicate glass, such as soda-lime silicate glass or sodium aluminosilicate glass comprises alumina, at least one alkali metal and, in some embodiments, greater than 50 mol % $SiO_2$, in other embodiments at least 58 mol % $SiO_2$, and in still other embodiments at least 60 mol % $SiO_2$. In these embodiments, a $Li_2O+Na_2O+K_2O$ total mol %, such as in a volume associated with a diffusion depth, is at least about 1, 2, 5, 7 or 8-10 mol % and ≤25 mol %, preferably ≤20 mol %, and more preferably ≤about 2, 5, 7, 8, 10, 12, or 16-18 mol %.

In another exemplary embodiment, an alkali aluminosilicate glass comprises, consists essentially of, or consists of: 60-75 mol % $SiO_2$; 5-15 mol % $Al_2O_3$; 0-12 mol % $B_2O_3$; 8-21 mol % $Na_2O$; 0-8 mol % $K_2O$; 0-15 mol % $MgO$; and 0-3 mol % $CaO$. In these embodiments, such as in a volume associated with a diffusion depth, a $Li_2O+Na_2O+K_2O$ total mol % is at least about 1, 2, 5, 7 or 8-10 mol % and ≤25 mol %, preferably ≤20 mol %, and more preferably ≤about 2, 5, 7, 8, 10, 12, 15 or 16-18 mol %.

In yet another embodiment, an alkali aluminosilicate glass substrate comprises, consists essentially of, or consists of: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-15 mol % $MgO$; 0-10 mol % $CaO$; 0-5 mol % $ZrO_2$; 0-2 mol % $SnO_2$; 0-1 mol % $CeO_2$; wherein about 1, 2, 5, 7, 8, or 10-12 mol %≤$Li_2O+Na_2O+K_2O$≤about 2, 5, 7, 8, 10, 12, 15 or 16-20 mol %, such as in a volume associated with a diffusion depth, and 0 mol %≤$MgO+CaO$≤15 mol %.

In one example embodiment, sodium ions in the substrate glass are replaced by potassium ions from a molten bath, though other alkali metal ions having a larger atomic radius, such as rubidium or cesium, may replace smaller alkali metal ions in the glass. Similarly, other alkali metal salts such as, but not limited to, nitrates, sulfates, halides, and the like may be used in the ion exchange process.

In another example embodiment, a chemically-strengthened glass substrate can have a surface compressive stress of about 200 MPa or more, e.g., about 300, 400, 500, 600, 700, 800, 900, 1000 or 1500 MPa or more, a case depth of about 5 µm or more (e.g., about 5, 10, 20, 25, 30, 35, 40, 45, 50, 55, 60, 65, 70, 75, 80, 85, 90, 95, 100 µm or more) and a diffusion depth of about 5 µm or more (e.g., about 5, 10, 20, 25, 30, 35, 40, 45, 50, 55, 60, 65, 70, 75, 80, 85, 90, 95, 100, 125 or 150 µm or more).

In another example embodiment, a chemically-strengthened glass substrate can have a higher amount of metal in at least one surface volume or layer, such as a treatment-rich volume or a treatment-poor volume, than in a bulk volume adjacent these surface volumes. A concentration of metal in at least one of the treatment-poor volume and the treatment-rich volume may be ≥ about 0.4, 1.0, 1.5, 2.0, 2.5, 3.0, 4.0, 5.0, 6.0, 8.0, 10.0, 12.0, 15.0, 20 or 25 mol % higher than a concentration of the metal in the bulk volume. According to an embodiment, a concentration of metal in the treatment-poor volume is higher than a concentration of the metal in a treatment-rich volume. A common example of strengthened glass with variant metal concentrations in the different volumes is chemically strengthened glass made from a flat glass substrate prepared using a float glass process utilizing tin.

In another example embodiment, a chemically-strengthened glass substrate may have an average concentration of alkali ions (e.g. invading alkali ions and host alkali ions) that is the same or different in a diffusion depth of a surface volume than in an adjacent volume, such as a bulk volume. The surface volume may be a treatment rich volume or a treatment-poor volume in the strengthened glass. The average concentration of alkali ions may be the same or different from an average concentration of alkali ions in the adjacent volume, such as a bulk volume. In one example embodiment, the average concentration of alkali ions in the diffusion depth of the surface volume is ≤to about 0.5 mol % higher than a concentration of the alkali ions in the bulk volume. In other embodiments, the average concentration of alkali ions in the diffusion depth of the surface volume is ≤to about 0.4, 0.3, 0.2, 0.1 or 0.05 mol % higher, equal to or less than a concentration of the alkali ions in the bulk volume adjacent the surface volume.

Exemplary Exchange Mediums

Exemplary embodiments of a liquid exchange medium which may be utilized in chemical strengthening include liquid molten salt baths. The molten liquid baths include invading alkali ions having an average ionic radius in the alkali metal ion of the molten salt that is larger than an average ionic radius of host alkali metal ions in the substrate glass prior to ion exchange. A common example of a liquid molten salt bath includes potassium nitrate with potassium as the invading alkali ion to replace sodium and/or lithium host ions in the substrate glass.

Mixed salt blends of invading alkali ions may also be used as liquid exchange mediums. These blends may include salts of different alkali metals, preferably different alkali metal nitrates. A nitrate melt blend may include at least two different alkali ions, for example Na and K, or as well Na and Rb. But it is also possible that three or four different alkali metals are included. Rb ions or Cs ions may be used in chemical strengthening. The method according to the embodiment offers the option to effectively incorporate invading alkali ions into a treated glass article having ionic radii that are significantly larger than the radii of host alkali ions, such as lithium or sodium ions.

Exemplary embodiments of a solid exchange medium which may be utilized in chemical strengthening include semi-solid pastes that may be applied to a surface of a glass substrate. The paste includes invading alkali ions from a source such as a salt and at least one rheological agent, such as clay, to suspend the ions in the solid exchange medium. Kaolin is a common example of a rheological agent which may utilized in making a solid exchange medium. The viscosity of a paste made with kaolin may be modified with water and other additives to suit an application by which the paste is applied to a glass substrate. Water content of a paste may be evaporated prior to application as a solid exchange medium utilizing a raised high temperature, such as greater than 120° C. Another example of a rheological agent is aluminosilicate fiber. Other clays and rheological agents are also contemplated.

In addition to liquid and solid exchange mediums, gas exchange mediums are also contemplated.

EXAMPLES

The following examples demonstrate methods of making chemically strengthened glass utilizing differential areal density methodology.

Example 1

Figure 2:
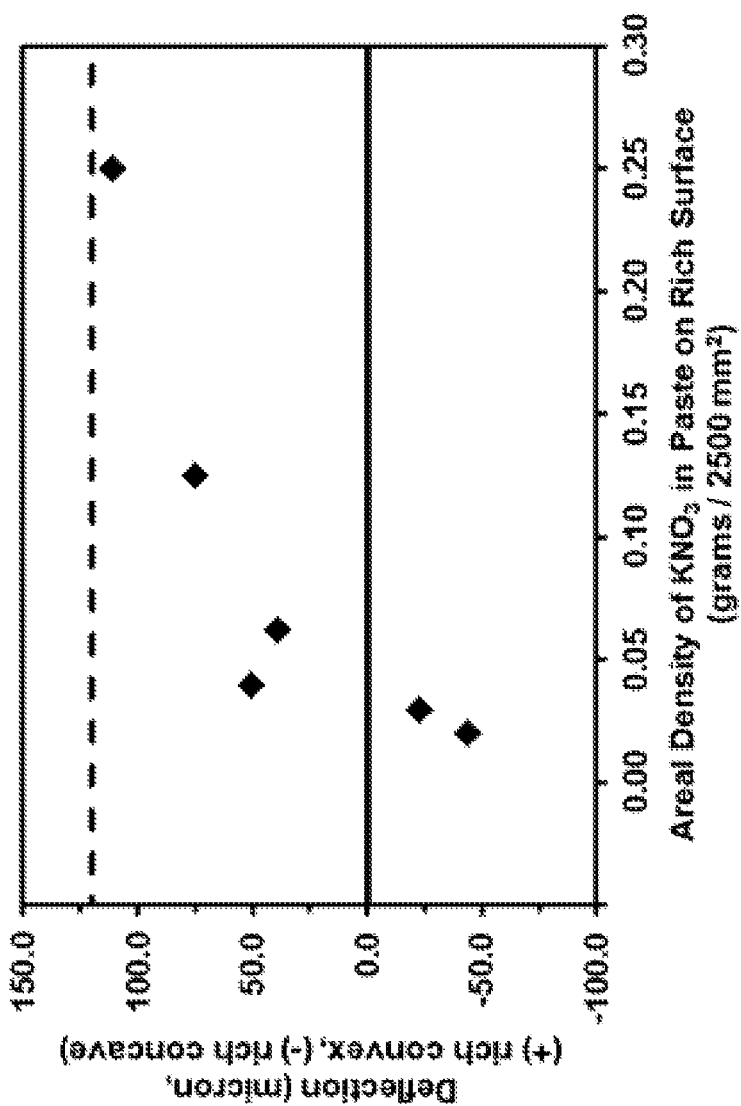
FIG. 2 is a graph about properties of exemplary strengthened substrates made utilizing exchange mediums applied to soda-lime silicate glass.

Example 1 demonstrates the preparation of a chemically strengthened soda-lime silicate glass having a reduced induced curvature. Reference is made to graph 200 in FIG. 2 in the example. Graph 200 shows results associated with a differential areal density methodology. An areal density of $KNO_3$ in a paste applied to a "rich surface" (i.e., a surface of a treatment-rich volume in a substrate) is given in grams/2,500 $mm^2$ on the abscissa. Deflection for a flat glass having 50 mm span is given in microns on the ordinate. Note that for this example, an ideal flatness, (i.e., a near zero induced curvature) is crossed between 0.030 and 0.040 grams/2,500 $mm^2$, as shown by the data plotted in graph 200.

Sample preparation: Soda-lime silicate glass coupons, 50 mm×50 mm across and 0.4 mm width, were cut from a mother sheet formed by a tin float glass process. Both surfaces (i.e., the rich surface and the poor surface) of the coupons were manually coated with a uniformly level layer of the $KNO_3$-containing paste as a solid exchange medium, however different volumes of the paste were applied to the different sides of different coupons to demonstrate the effect of varying the areal density by varying the volume of the paste applied. The differences in volume were measured in terms of mass applied on each side.

The areal density of $KNO_3$ in paste applied on the poor surface was held constant at 2,520 g/2500 $mm^2$ and the areal density of $KNO_3$ in paste applied on the rich surface varied on separate coupons: 0.020, 0.030, 0.040, 0.063, 0.125, and 0.250 g/2500 $mm^2$. After drying the pastes on the coupons, all coupons were processed in air at 440° C. for 24 hours. After ion exchange treatment, the treated coupons were removed, air-cooled, and rinsed with water to remove the paste. A minimum of two coupons were examined for each parameter.

Results: Coupon deflection after processing was determined from surface profiles measured using a non-contact optical profiler. Deflection is the peak-to-valley height determined along a line drawn between opposite edge mid-points of the square coupon. Deflection versus areal density of $KNO_3$ in paste is given in graph 200. A positive deflection measurement in graph 200 indicates convex curvature of the rich surface. A negative deflection measurement indicates concave curvature of the rich surface.

For commercial purposes, such as for utilization in personal electronic devices and flat panel displays, an acceptable deflection is about 0.1% of the linear span—corresponding to 50 microns for a 50 mm span. The $KNO_3$ areal density of $KNO_3$ in the paste of 0.020, 0.030, 0.040, and 0.063 g/2500 $mm^2$ produced a deflection measurement of less than the 50 micron target in this example. The ideal flat was crossed between 0.030 and 0.040 g/2500 $mm^2$. At 0.030 g/2500 $mm^2$, average deflection was −22.6 micron (rich side concave), average surface compression was 333 MPa for the rich surface and 347 MPa for the poor surface, average case depth was 24.3 micron for the rich surface and 23.5 micron for the poor surface.

Comparative sample coupons, which had 2.500 g/2500 $mm^2$ $KNO_3$ in the paste applied to the rich surface and 2.500 g/2500 $mm^2$ $KNO_3$ in the paste applied to the poor surface, and otherwise underwent equivalent processing had average deflection of 196 micron (rich side convex), average surface compression was 412 MPa for the rich surface and 379 MPa for the poor surface, and average case depth was 27.1 micron on the rich surface and 27.9 micron on the poor surface. The average deflection of the comparative sample coupons is represented by the horizontal dashed line in graph 200 of FIG. 2.

Example 2

Figure 3:
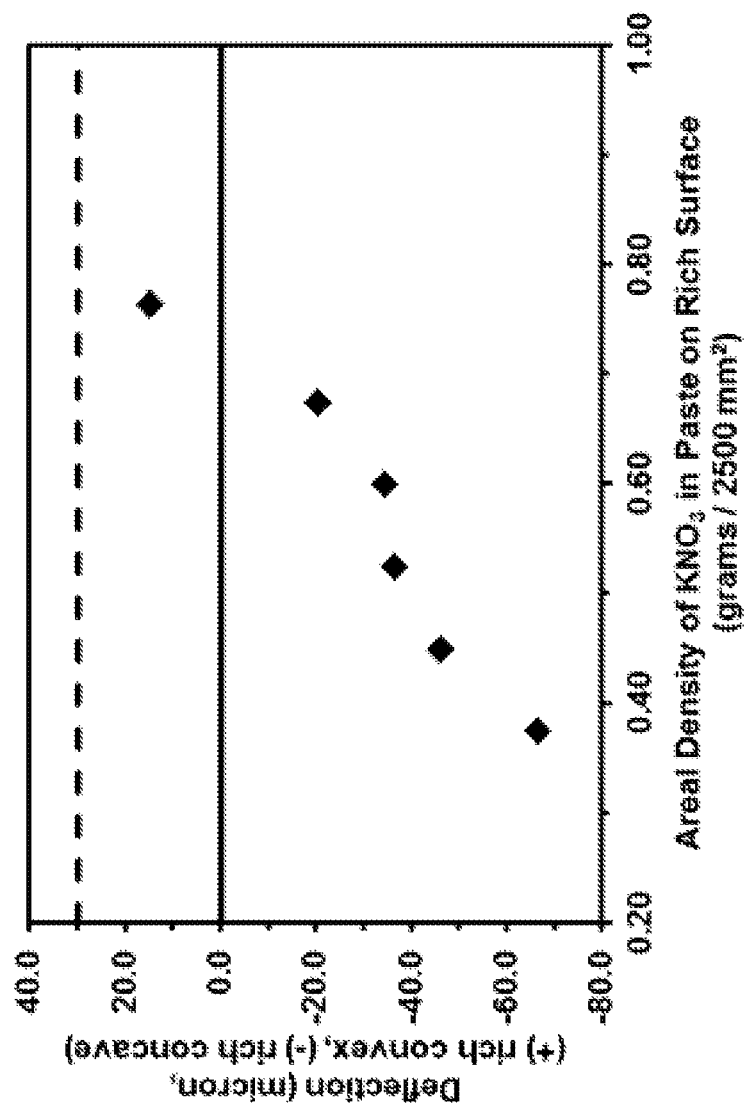
FIG. 3 is a graph about properties of exemplary strengthened substrates made utilizing exchange mediums applied to sodium aluminosilicate glass.

Example 2 demonstrates the preparation of a chemically strengthened aluminosilicate glass having a reduced induced curvature. Reference is made to graph 300 in FIG. 3. Graph 300 shows results associated with a differential areal density methodology. An areal density of $KNO_3$ in a paste applied to a "rich surface" (i.e., a surface of a treatment-rich volume in a substrate) is given in grams/2,500 $mm^2$ on the abscissa. Deflection for a flat glass having 50 mm span is given in microns on the ordinate. Note that for this example, an ideal flatness, (i.e., a near zero induced curvature) is crossed between 0.675 and 0.765 grams/2,500 $mm^2$, as shown by the data plotted in graph 300.

Sample Preparation: Sodium aluminosilicate glass coupons, 50 mm×50 mm×0.56 mm width, were cut from a mother sheet formed by the tin float process. Both surfaces (i.e., the treatment rich surface and the treatment-poor surface) of the coupons were manually coated with a uniformly level layer of the $KNO_3$-containing paste as a solid exchange medium. However different volumes of the paste were applied to the different sides to demonstrate the effect of varying the areal density by varying the volume of the paste applied. The differences in volume were measured in terms of mass applied on each side.

The areal density of $KNO_3$ in paste applied on the poor surface was held constant at 2.520 g/2500 $mm^2$ and the areal density of $KNO_3$ in paste applied on the rich surface varied on separate coupons: 0.375, 0.450, 0.525, 0.600, 0.675, and 0.765 g/2500 $mm^2$. After drying the pastes on the coupons, all coupons were processed in air at 450° C. for 2 hours. After the exchange treatment, the coupons were removed, air-cooled, and rinsed with water to remove the paste. A minimum of two coupons were examined for each parameter.

Results: Coupon deflection after processing was determined from surface profiles measured using a non-contact optical profiler. Deflection is the peak-to-valley height determined along a line drawn between opposite edge mid-points of the square coupon. Deflection versus pre-treatment time is given in graph 300. A positive deflection measurement in graph 300 indicates convex curvature of the rich surface. A negative deflection measurement indicates concave curvature of the rich surface.

For commercial purposes, such as for utilization in personal electronic devices and flat panel displays, an acceptable deflection is about 0.1% of the linear span—corresponding to 50 microns for a 50 mm span. The $KNO_3$ areal density of 0.450, 0.525, 0.600, 0.675, and 0.765 g/2500 $mm^2$ produced a deflection measurement of less than the 50 micron target in this example. The ideal flat was crossed between 0.675 and 0.765 g/2500 $mm^2$. At 0.675 g/2500 $mm^2$, average deflection was −20.6 micron (rich side concave), average surface compression was 704 MPa for the rich surface and 700 MPa for the poor surface, average case depth was 37.9 micron for the rich surface and 37.8 micron for the poor surface.

Comparative sample coupons, which had 2.519 g/2500 mm² KNO₃ in paste applied to the rich surface and 2.519 g/2500 mm² KNO₃ in paste applied to the poor surface, and otherwise underwent equivalent processing had average deflection of 41.4 micron (rich side convex), average surface compression was 737 MPa for the rich surface and 743 MPa for the poor surface, and average case depth was 35.3 micron on the rich surface and 36.2 micron on the poor surface. The average deflection of the comparative sample coupons is represented by the horizontal dashed line in graph 300 of FIG. 3.

Figure 4:
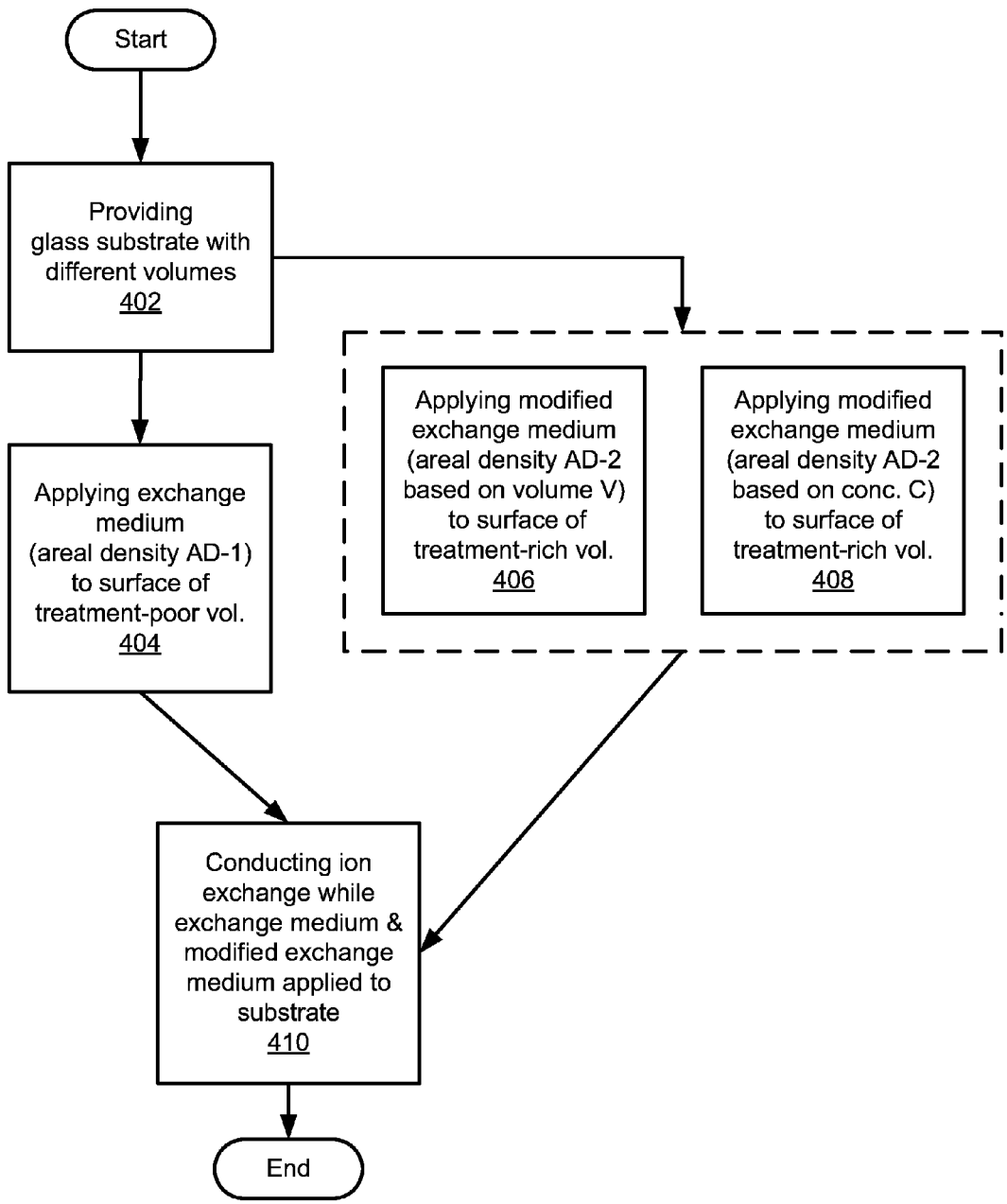
FIG. 4 is a flowchart illustrating exemplary processes for making a strengthened substrate.

FIG. 4 is flowchart illustrating exemplary processes for making a strengthened substrate.

At step 402, a glass substrate is provided having different volumes, such as a "treatment-rich" volume and a "treatment-poor" volume in the glass structure including host alkali ions. The glass may be soda-lime silicate glass or aluminosilicate glass. The volumes may be located, for example, as opposed to each other in the substrate, and according to an embodiment, may be diametrically opposed. The glass substrate may have variations in the different volumes, such as a variation in chemical composition and/or chemical structure. An example of a variation in chemical composition is an amount of tin situated in different volumes of the glass. An example of a variation in chemical structure is the presence of tin in different valences, $Sn^{2+}$ and $Sn^{4+}$ in different volumes of the glass. A variation in chemical composition and/or chemical structure in the treatment-poor volume may distinguish it from the treatment-rich volume.

At step 404, a solid exchange medium having an areal density (shown as "AD-1" in FIG. 4) of invading alkali ions is applied to a surface of the treatment-poor volume. In another embodiment, a liquid exchange medium having areal density AD-1 of invading alkali ions is applied to a surface of the treatment-poor volume.

At step 406, according to an embodiment, a solid exchange medium having a modified areal density (shown as "AD-2" in FIG. 4) of invading alkali ions is applied to a surface of the treatment-rich volume. The modified exchange medium has a smaller volume than the exchange medium applied in step 404, but is otherwise equivalent to the exchange medium applied in step 404.

Step 408 demonstrates an alternative embodiment/step than step 406. At step 408, according to the alternative embodiment, a solid exchange medium having a modified areal density (shown as "AD-2" in FIG. 4) of invading alkali ions is applied to a surface of the treatment-rich volume. The modified exchange medium has a smaller concentration of invading alkali ions than the exchange medium applied in step 404, but is otherwise equivalent to the exchange medium applied in step 404.

At step 410, ion exchange is conducted on the glass substrate with the exchange medium and the modified exchange medium applied to the respective surfaces. According to an embodiment, a net bending moment about midplane in the substrate is about zero in a fully strengthened substrate.

Although described specifically throughout the entirety of the disclosure, the representative examples have utility over a wide range of applications, and the above discussion is not intended and should not be construed to be limiting. The terms, descriptions and figures used herein are set forth by way of illustration only and are not meant as limitations. Those skilled in the art recognize that many variations are possible within the spirit and scope of the principles of the invention. While the examples have been described with reference to the figures, those skilled in the art are able to make various modifications to the described examples without departing from the scope of the following claims, and their equivalents.

What is claimed is:

1. A method for making a strengthened substrate, the method comprising:
   applying an exchange medium to a surface of a treatment-poor volume of a substrate,
      wherein the substrate has a glass chemical structure including host alkali ions having an average ionic radius situated in the glass chemical structure,
      wherein the treatment-poor volume is one of dimensional volumes included in the substrate, and
      wherein the exchange medium has an areal density of invading alkali ions having an average ionic radius that is larger than the average ionic radius of the host alkali ions, and the areal density is associated with an ion exchange rate of the invading alkali ions;
   applying a modified exchange medium to a surface of a treatment-rich volume of the substrate,
      wherein the treatment-rich volume is one of the dimensional volumes included in the substrate, and the treatment-rich volume and the treatment-poor volume are located as opposed to each other in the substrate,
      wherein a modified exchange medium has a modified areal density of the invading alkali ions, and the modified areal density is associated with a modified ion exchange rate of the invading alkali ions, and
      wherein the modified ion exchange rate is slower than the ion exchange rate;
   conducting first ion exchange while applying the exchange medium; and
   conducting second ion exchange while applying the modified exchange medium,
   wherein the first ion exchange and the second ion exchange are conducted concurrently to produce the strengthened substrate.

2. The method of claim 1, wherein the modified ion exchange rate is associated with a concentration of the invading alkali ions in the modified exchange medium that is lower than a concentration of the invading alkali ions in the exchange medium.

3. The method of claim 1, wherein the modified ion exchange rate is associated with a volume of the modified exchange medium applied to the treatment-rich surface that is smaller than a volume of the exchange medium applied to the treatment-poor surface.

4. The method of claim 1, wherein the modified ion exchange rate is associated with at least one of
   a concentration of the invading alkali ions in the modified exchange medium that is lower than a concentration of the invading alkali ions in the exchange medium and
   a volume of the modified exchange medium applied to the treatment-rich surface that is smaller than a volume of the exchange medium applied to the treatment-poor surface.

5. The method of claim 1, wherein the substrate comprises a variation in at least one of chemical composition and chemical structure in the substrate
   wherein at least one of the chemical composition and chemical structure in the treatment-poor volume is different than in the treatment-rich volume.

6. The method of claim 1, wherein a net bending moment about a mid-plane due to stress from the first and second ion exchanges is about zero in the strengthened substrate.

7. The method of claim 1, wherein a compressive stress varies at different locations of the strengthened substrate.

8. The method of claim 1, wherein each of the first ion exchange and the second ion exchange is performed at a constant temperature.

9. The method of claim 1, wherein each of the first ion exchange and the second ion exchange is performed while applying about an equal temperature to the treatment-poor volume and the treatment-rich volume.

10. The method of claim 1, wherein each of the exchange medium and the modified exchange medium is one of a liquid, a solid, a gas and mixtures thereof.

11. The method of claim 1, wherein the treatment-rich volume and the treatment-poor volume are located as diametrically opposed in the substrate.

12. The method of claim 1, wherein the method is one of a continuous process and a batch process.

13. The method of claim 1, wherein the substrate comprises one of alkali aluminosilicate glass and soda-lime silicate glass.

14. The method of claim 1, wherein the substrate is flat.

15. The method of claim 1, wherein the substrate has a width of about 3.0 millimeters or less.

16. The method of claim 1, wherein each of the exchange medium and the modified exchange medium is applied in a paste.

* * * * *